US011927101B1

(12) United States Patent
Waller et al.

(10) Patent No.: US 11,927,101 B1
(45) Date of Patent: Mar. 12, 2024

(54) MACHINE RING MULTI-SLOPE TIPSHOE/TIP SHROUD/OUTER AIR SHROUD

(71) Applicant: Solar Turbines Incorporated, San Diego, CA (US)

(72) Inventors: Megan K. Waller, San Diego, CA (US); Jeffrey B. Stewart, Cross Hill, SC (US); George Prater, San Diego, CA (US); James Maleski, Lakewood, CO (US); Victor Antonio Chagala Galicia, Tijuana (MX); Antonio Fajardo Celis, El Florido (MX); Marius Dumitrascu, San Diego, CA (US); Jeffrey Tarczy, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/901,769

(22) Filed: Sep. 1, 2022

(51) Int. Cl.
 *F01D 11/08* (2006.01)
 *F02C 7/28* (2006.01)

(52) U.S. Cl.
 CPC .............. *F01D 11/08* (2013.01); *F02C 7/28* (2013.01); *F05D 2260/30* (2013.01)

(58) Field of Classification Search
 CPC .................................. F01D 11/08; F02C 7/28
 See application file for complete search history.

(56) References Cited

U.S. PATENT DOCUMENTS

| 7,001,152 | B2 | 2/2006 | Paquet et al. |
| 8,206,085 | B2 | 6/2012 | Ammann |
| 11,015,613 | B2* | 5/2021 | Kerns ...................... F01D 11/08 |
| 2008/0240915 | A1* | 10/2008 | Castel ................... F01D 11/005 |
| | | | 415/208.2 |
| 2010/0278631 | A1* | 11/2010 | Heda ....................... F01D 11/24 |
| | | | 415/115 |
| 2012/0107122 | A1* | 5/2012 | Albers ................. F01D 11/005 |
| | | | 416/179 |
| 2018/0230839 | A1 | 8/2018 | Gallier et al. |

* cited by examiner

*Primary Examiner* — Katheryn A Malatek
(74) *Attorney, Agent, or Firm* — Procopio, Cory, Hargreaves & Savitch LLP

(57) ABSTRACT

Tip shrouds or other shrouds with multi-slope geometries are generally implemented using segments, since performing the necessary cut for an alternative split-ring design is difficult given conventional cutting processes. However, a segmented design generally results in more leakage, relative to a split-ring design. Accordingly, a split-ring multi-slope design is disclosed that can be more easily manufactured. In particular, a continuous ring may be cut along a linear path to produce a split ring, and then the ends of the split ring may be machined to form complementary shiplap portions. The split ring may then be compressed for installation by overlapping the shiplap portions, to form a seal against leakage through the shroud.

14 Claims, 6 Drawing Sheets

MACHINE RING MULTI-SLOPE TIPSHOE/TIP SHROUD/OUTER AIR SHROUD

TECHNICAL FIELD

The embodiments described herein are generally directed to a shroud, and, more particularly, to a multi-slope tipshoe, tip shroud, or outer air shroud that is machined from a ring.

BACKGROUND

A gas turbine engine may comprise a shroud that encircles a component of the gas turbine engine, such as a rotor assembly in the turbine or compressor. This shroud is generally called a "tipshoe" or "tip shroud." More generally, the shroud may be called an "outer air shroud" and defines a portion of the flow path of gas flowing through the gas turbine engine. In many cases, it would be beneficial for at least the radially inward facing surface of the shroud to have a multi-slope geometry, since this would enable the shroud to better follow the profile of the flow path, as well as the case of the gas turbine engine.

Shrouds are generally manufactured as either a single integral ring or segments that are connected together by seal strips to form a ring. In the case of an integral ring, the ring must be split, prior to installation, so that it may overlap and seal on itself during operation. For example, a conical or cylindrical ring may be split by using wire electrical discharge machining (EDM) to make a "z-cut" through the ring. The z-cut involves cutting radially along a straight path through a portion of the ring between the inner and outer diameters, turning 90 degrees and cutting circumferentially through the ring, and then turning 90 degrees again and cutting radially along a straight path through the remaining portion of the ring between the inner and outer diameters. This enables the cut portions of the ring to overlap each other across a radial axis of the ring.

However, it is difficult to split a ring with multi-slope geometry. In particular, if the ring has a multi-slope geometry, it is not possible to make a z-cut through the ring using, for example, wire EDM. This is because wire EDM requires straight paths through the material, and this is not possible when the circumferential cut must be made along multiple slopes.

Consequently, shrouds with multi-slope geometries are generally implemented using segments. For example, U.S. Patent Pub. No. 2018/0230839A1 describes a shroud that uses segments with overlapping shiplap elements. However, segmented rings present greater potential for leakage through the shroud than split rings. In particular, gas may leak through each of the spaces between segments.

Thus, what is needed is a design for a split-ring shroud that can be more easily machined. The present disclosure is directed toward overcoming one or more of the problems discovered by the inventors.

SUMMARY

In an embodiment, an annular shroud comprises: a split ring that consists of a single split with a first axial edge and a second axial edge on opposing sides of the split, wherein a radially inward facing surface of the split ring comprises a multi-slope geometry from a leading edge of the split ring to a trailing edge of the split ring, wherein the split ring includes a first shiplap portion comprising a recess extending from the first axial edge into the radially inward facing surface of the split ring, wherein the split ring includes a second shiplap portion comprising a recess extending from the second axial edge into a radially outward facing surface of the split ring, and wherein the first shiplap portion and the second shiplap portion are configured to at least partially overlap each other.

In an embodiment, a gas turbine engine comprises: a compressor; a combustor downstream from the compressor; and a turbine downstream from the combustor, wherein the turbine comprises a plurality of stages, and wherein at least one of the plurality of stages comprises a turbine rotor assembly, and an annular shroud encircling the turbine rotor assembly and concentric with the turbine rotor assembly and a longitudinal axis of the turbine, wherein the annular shroud comprises a split ring that consists of a single split with a first axial edge and a second axial edge on opposing sides of the split, wherein a radially inward facing surface of the split ring comprises a multi-slope geometry from a leading edge of the split ring to a trailing edge of the split ring, wherein the split ring includes a first shiplap portion comprising a recess extending from the first axial edge into the radially inward facing surface of the split ring, wherein the split ring includes a second shiplap portion comprising a recess extending from the second axial edge into a radially outward facing surface of the split ring, and wherein the first shiplap portion and the second shiplap portion at least partially overlap each other.

In an embodiment, a method comprises: manufacturing an annular shroud as a continuous ring with a first diameter, wherein a radially inward facing surface of the continuous ring comprises a multi-slope geometry from a leading edge of the continuous ring to a trailing edge of the continuous ring; splitting the continuous ring along a single radial path to produce a split ring with a first axial edge and a second axial edge on opposing sides of the split; machining a recess from the first axial edge into the radially inward facing surface of the split ring to form a first shiplap portion; machining a recess from the second axial edge into the radially outward facing surface of the split ring to form a second shiplap portion; and at least partially overlapping the first shiplap portion and the second shiplap portion to form a closed ring with a second diameter that is smaller than the first diameter.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
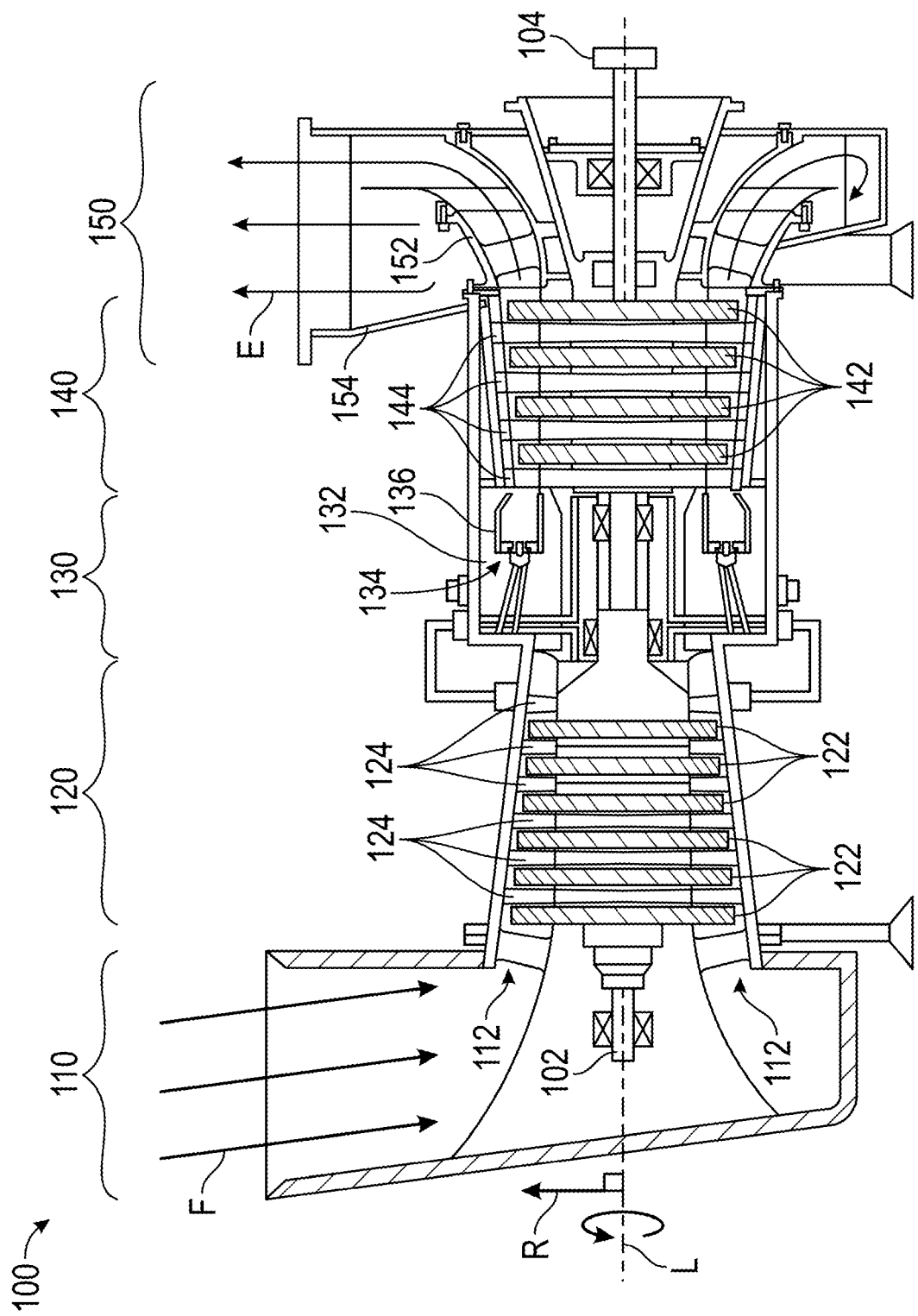
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
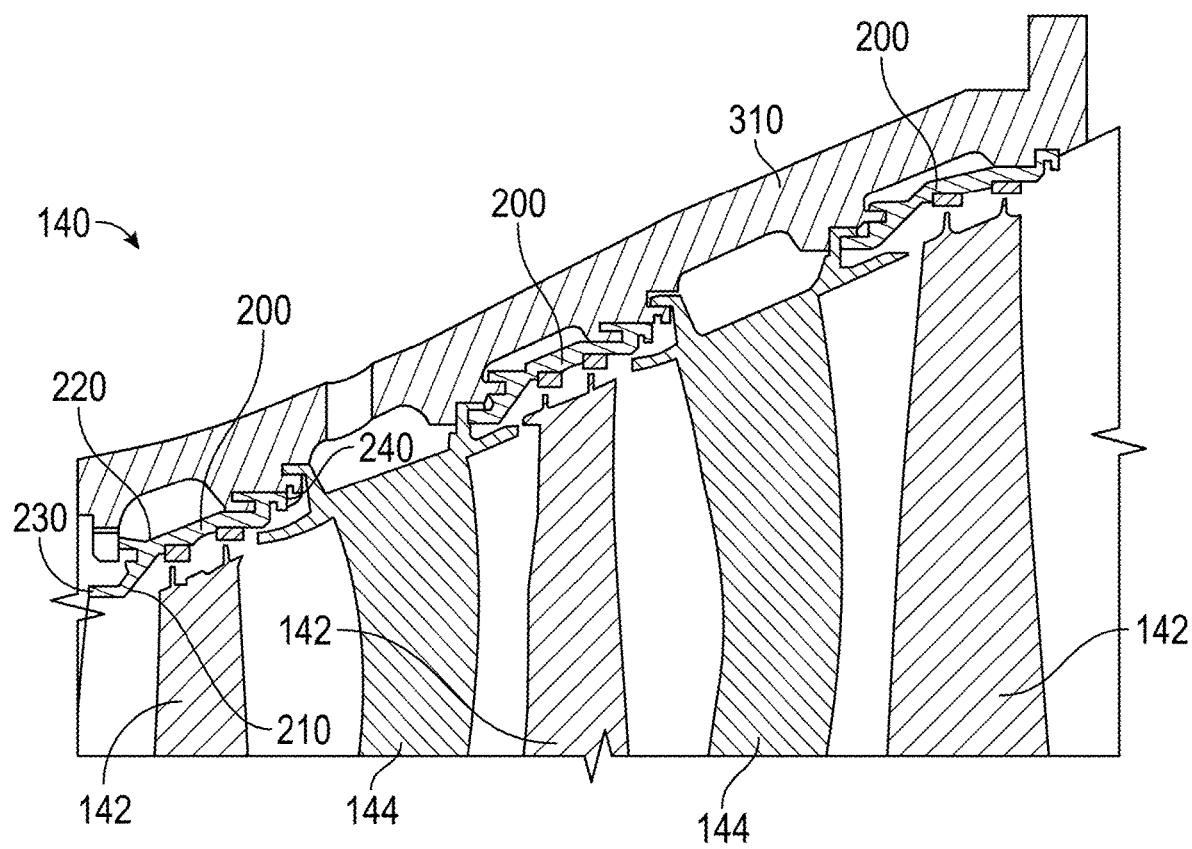
FIG. 2 illustrates a schematic diagram of an example section of a gas turbine engine in which one or more shrouds may be employed, according to an embodiment.

FIG. 2 illustrates a schematic diagram of an example section of a gas turbine engine 100 in which one or more annular shrouds 200 may be employed, according to an embodiment. In particular, three stages of a turbine 140 are illustrated. Each stage comprises a turbine rotor assembly 142 that is encircled by a shroud 200. Each shroud 200 is formed as or comprises a ring that is concentric with the corresponding turbine rotor assembly 142 and longitudinal axis L of gas turbine engine 100. As will be discussed elsewhere herein, the ring is a split ring.

While shroud 200 will be illustrated herein as encircling a turbine rotor assembly 142, it should be understood that the disclosed shroud 200 may be used to encircle any component. For example, a shroud 200 may encircle a compressor rotor assembly 122 in one or more stages of compressor 120. In general, shroud 200 may be concentric with the encircled component, for example, around longitudinal axis L. It should also be understood that, while shroud 200 is illustrated for each of three stages, shroud 200 may be utilized for any number of stages of components, including one stage, two stages, four stages, all stages, and so on. In embodiments in which a shroud 200 is used for each of a plurality of stages, shrouds 200 may comprise different inner and/or outer diameters from each other, reflecting a change in the diameter (e.g., representing expansion or contraction) of the flow path through the plurality of stages. In addition, each shroud 200 may comprise a different geometry, including a different multi-slope geometry, again reflecting a change in the geometry of the flow path through the plurality of stages.

In any case, each shroud 200 may comprise a radially inward facing surface 210 and a radially outward facing surface 220, both extending between a leading edge 230 and a trailing edge 240. Radially inward facing surface 210 is exposed to the flow path of gas and defines a portion of the flow path with a multi-slope geometry. Radially outward facing surface 220 opposes radially inward facing surface 210, and may comprise one or more engagement features to facilitate installation and securement of shroud 200 to other components of gas turbine engine 100, such as a turbine housing 310.

Figure 3:
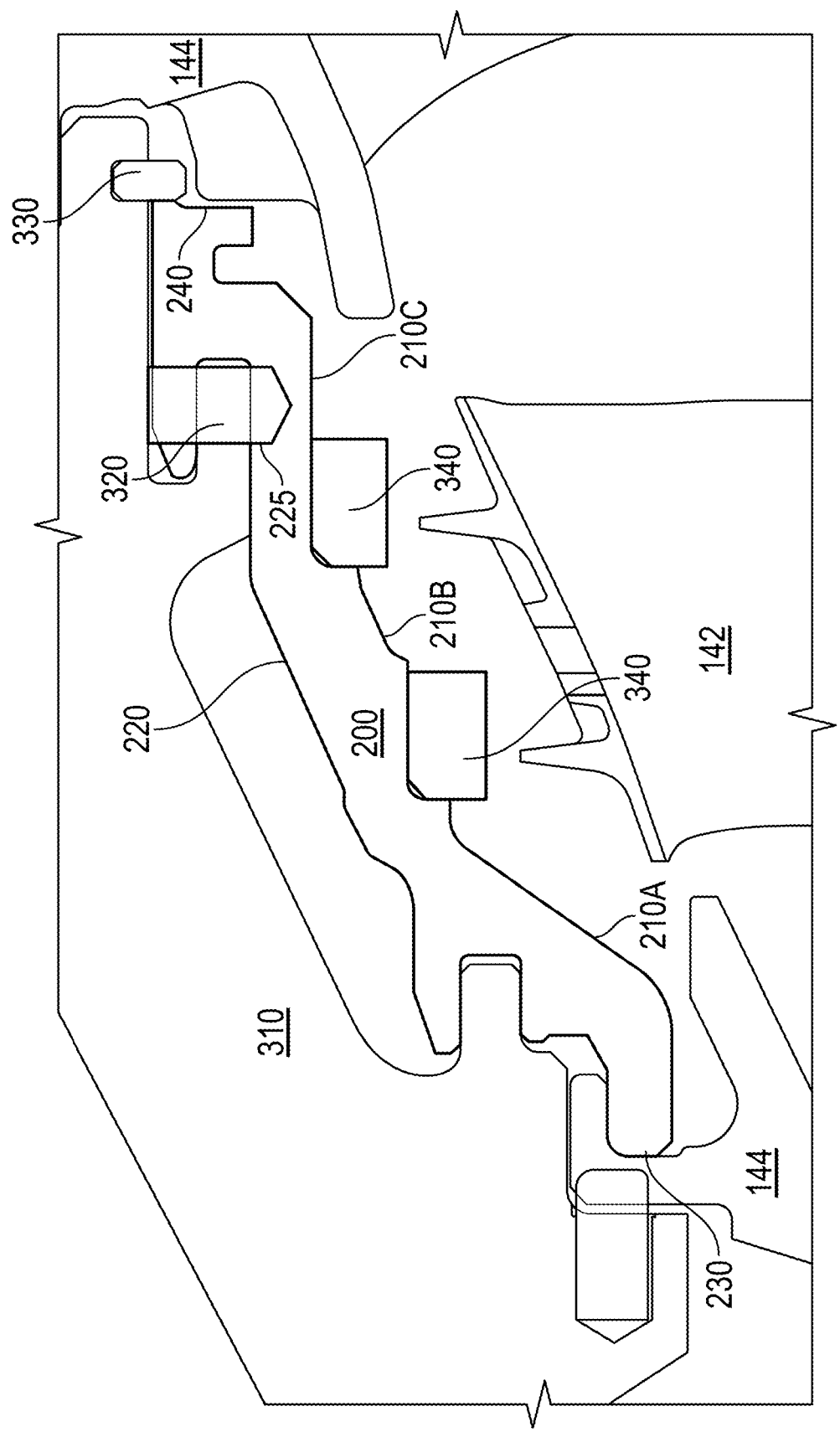
FIG. 3 illustrates a cross-sectional side view of an example shroud with a multi-slope geometry, installed within a turbine section, according to an embodiment.

FIG. 3 illustrates a cross-sectional view of an example shroud 200 with a multi-slope geometry from leading edge 230 to trailing edge 240, installed within a section of turbine 140, according to an embodiment. In the illustrated example, shroud 200 is installed around a turbine rotor assembly 142 and is sandwiched between the radially outer ends of two turbine stator assemblies 144. Radially outward facing surface 220 of shroud 200 may comprise one or more engagement features, such as annular recesses or grooves that engage with corresponding annular protrusions in turbine housing 310 along an axial axis, or annular protrusions that engage with corresponding annular recesses or grooves in turbine housing 310. An anti-rotation pin 320 may be inserted into a pin hole formed by an aperture through turbine housing 310 and an aligned aperture 225 through a portion of shroud 200, to thereby prevent rotation of shroud 200 relative to turbine housing 310. While aligned apertures are illustrated as radially oriented, such that anti-rotation pin 320 is inserted radially into the aligned apertures, in an alternative embodiment, the aligned apertures could be axially oriented, such that anti-rotation pin 320 is inserted axially into the aligned apertures, or in some other orientation, as long as anti-rotation pin 320 prevents rotation of shroud 200 relative to turbine housing 310. In addition, an abutment ring 330 may be inserted within a corresponding radial recess or groove in turbine housing 310 to abut trailing edge 240 of shroud 200, to thereby prevent shroud 200 from sliding axially downstream relative to turbine housing 310.

A honeycomb structure 340 or alternative abradable material may be affixed to radially inward facing surface 210, to improve performance of turbine 140 by reducing radial clearance and accommodating a potential rub.

In an alternative embodiment, shroud 200 could be installed on a support ring of one or more stator assemblies, such as the support ring of turbine stator assemblies 144, instead of to turbine housing 310 directly. In this case, shroud 200 may comprise one or more engagement features, such as annular recesses or grooves that engage with corresponding annular protrusions in the support ring along an axial axis, or annular protrusions that engage with corresponding annular recesses or grooves in the support ring. In all other respects, shroud 200 may be the same as described herein. For example, an anti-rotation pin may be inserted into a pin hole formed by an aperture through the support ring and an aligned aperture through a portion of shroud 200, to thereby prevent rotation of shroud 200 relative to the support ring. In addition, an abutment ring may be inserted with a corresponding radial recess or groove in the support ring to abut trailing edge 240 of shroud 200, to thereby prevent shroud 200 from sliding axially downstream relative to the support ring. It should be understood that the support ring may be affixed to turbine housing 310 in any suitable manner, and conceptually, may be considered part of turbine housing 310 for purposes of this description. Thus, any disclosure herein that refers to the engagement between shroud 200 and turbine housing 310 should be understood to potentially encompass an engagement between shroud 200 and a support ring of one or more stator assemblies that is affixed to turbine housing 310.

As illustrated, radially inward facing surface 210 of shroud 200 may have a multi-slope geometry. In particular, in the illustrated example, radially inward facing surface 210 has a first sloped portion 210A with a relatively steep slope, a second sloped portion 210B with a less steep slope than first sloped portion 210A, and a third sloped portion 210C with no slope. It should be understood that these are simply examples, and that a shroud 200 may have any number of different sloped portions with any variety of slopes.

Figure 4:
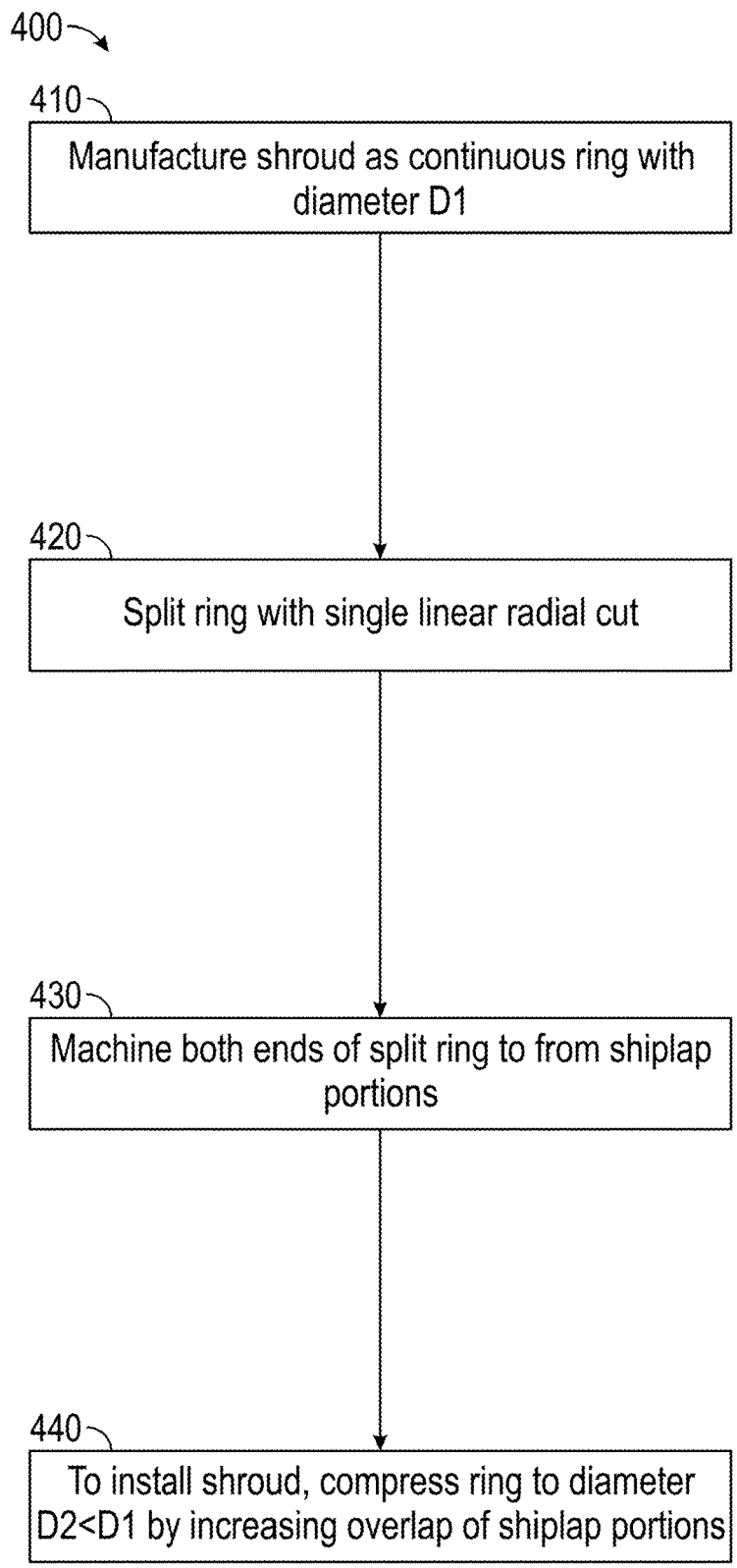
FIG. 4 illustrates an example process for producing and installing a shroud, according to an embodiment.

FIG. 4 illustrates an example process 400 for producing and installing a shroud 200, according to an embodiment. Each step in process 400 is juxtaposed to a corresponding one of FIGS. 5A-5D to illustrate an example shape of shroud 200, looking down its longitudinal axis, after that step, according to an embodiment.

Figure 5A:
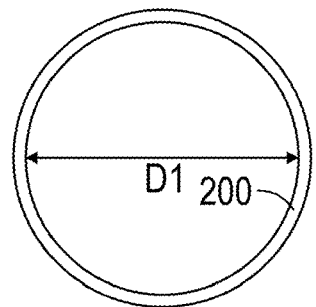
FIGS. 5A-5D illustrate an example shape of a shroud after each step in the process illustrated in FIG. 4, according to an embodiment.

In step 410, shroud 200 is manufactured as a single continuous ring of material having a multi-slope geometry. Shroud 200 may be manufactured by any method and any technology that are suitable for constructing a single continuous ring from material. For example, shroud 200 may be turned or milled from a solid piece of metal or cast or forged in a mold. The material may comprise a nickel alloy, such as nickel alloy 718 (commonly called Inconel™). However, disclosed embodiments may work with any type of material that can be formed into a ring. As illustrated in FIG. 5A, shroud 200 will consist of a continuous ring having an original diameter of D1. It should be understood that D1 will be dictated by, among other things, the final desired diameter of shroud 200, and may differ for different stages in gas turbine engine 100.

Figure 5B:
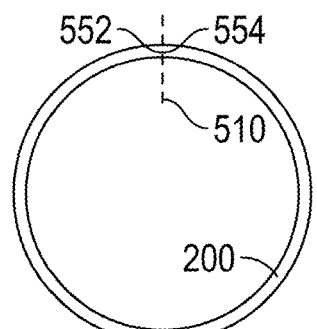

In step 420, the single continuous ring of shroud 200 may be split by cutting through the ring along a single linear path 510, as illustrated in FIG. 5B. Any method of cutting, such as wire EDM or a rotary blade, may be used to make the cut. As illustrated, the cut may be made along a radial axis of shroud 200. Notably, the cut is completely linear, and therefore, easy to perform using existing cutting means. As a result of the cut, shroud 200 will comprise a split ring with two axial edges 552 and 554 on opposing sides of the split. During cutting, a small amount of material, representing a circumferential portion of the ring, may be removed to create a gap between the two axial edges 552 and 554.

Figure 5C:
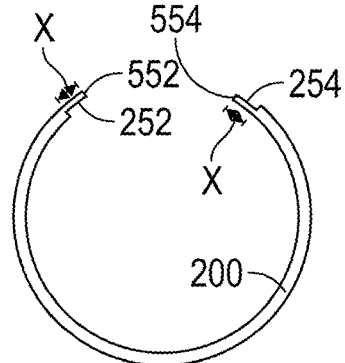

In step 430, both ends of the split ring of shroud 200 may be machined to form corresponding shiplap portions 252 and 254, as illustrated in FIG. 5C. In particular, a recess may be milled into each end of the split ring. The split ring may be expanded (i.e., the distance between axial edges 552 and 554 increased) to facilitate the machining process.

The recess of the first shiplap portion 252 may extend from the first axial edge 552 into radially inward facing surface 210, and the recess of the second shiplap portion 254 may extend from the second axial edge 554 into radially outward facing surface 220. In other words, each end of the split ring is thinned along a portion of its circumference starting at its respective axial edge 552 or 554. The recess and thinned portion of each of shiplap portions 252 and 254 may extend from axial edges 552 and 554, respectively, along the inner and outer circumferences, respectively, of the ring, for a length X. Both shiplap portions 252 and 254 may have substantially the same length X, but this is not a necessity of any embodiment.

Shiplap portion 252 on one end of the split ring comprises a recess on radially inward facing surface 210 of shroud 200, whereas shiplap portion 254 on the opposite end of the split ring comprises a recess on radially outward facing surface 220 of shroud 200. Thus, shiplap portions 252 and 254 are designed to engage with each other when the split ring is compressed. Compression causes shiplap portion 252 to overlap with shiplap portion 254, such that the recess of each shiplap portion 252 and 254 receives the thinned portion of the other shiplap portion 254 and 252. In a preferred embodiment, shiplap portions 252 and 254 have complementary surface profiles.

In FIG. 5C, the amount of material that is removed from each end (i.e., the length X of shiplap portions 252 and 254) is exaggerated to aid in visualization. In reality, length X may represent a very small fraction of the total circumference of shroud 200, and may depend on various design factors. For example, in a particular implementation, the ratio of length X of each of shiplap portions 252 and 254 to the total circumference of the ring upon installation may be between 0.005 and 0.010.

In an embodiment, an aperture 225 may be machined into shroud 200. Aperture 225 may be machined (e.g., drilled) into shroud 200 at any of steps 410, 420, and 430. Aperture 225 is configured to receive an anti-rotation pin 320. As illustrated, aperture 225 may be positioned 180 degrees around a circumference of the split ring from a point in the overlap region in which shiplap portions 252 and 254 overlap each other. This controls the line of the split, and ensures that thermal growth is equal on both sides of anti-rotation pin 320. However, the particular position of aperture 225 is not a requirement of any embodiment, and, in alternative embodiments, a plurality of apertures 225 may be machined into shroud 200 (e.g., at equidistant intervals around the circumference of shroud 200).

Figure 5D:
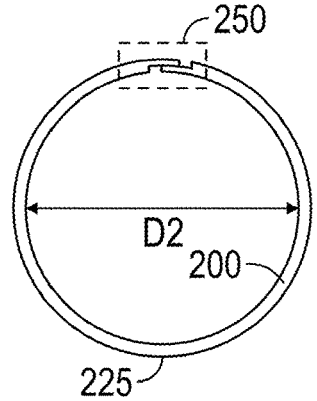

In step 440, shroud 200 may be installed into turbine 140. Firstly, the split ring may be compressed by overlapping or increasing the amount of overlap between shiplap portions 252 and 254 (collectively referred to herein as shiplap feature 250). This compression may be performed using any known method, which may or may not involve a tool. As a result of the compression, shroud 200 comprises a closed ring with a diameter D2, as illustrated in FIG. 5D. Secondly, the compressed closed ring may be slid into a corresponding space in turbine housing 310, where it may slightly expand to fill the space. As discussed elsewhere herein, one or more engagement features on radially outward facing surface 220 of shroud 200 may engage with one or more corresponding engagement features in turbine housing 310.

In an embodiment, aperture 225 may be aligned (e.g., along a radial or axial axis) with an aperture through a corresponding portion of turbine housing 310, and anti-rotation pin 320 may be inserted through the aligned apertures. The insertion of anti-rotation pin 320 prevents shroud 200 from rotating with respect to turbine housing 310. In an alternative or additional embodiment, rotation of shroud 200 with respect to turbine housing 310 may be prevented by a different anti-rotation feature, such as a milled lug in turbine housing 310.

In addition, an abutment ring 330 may be slid into turbine housing 310 to abut trailing edge 240 of shroud 200. Abutment ring 330 prevents shroud 200 from sliding axially downstream with respect to turbine housing 310, due to the axial loading on the shroud and upstream turbine stator assembly 144. It should be understood that, in an alternative embodiment in which turbine 140—or more likely, a compressor 120 that incorporates shroud 200—is assembled from aft-to-forward, abutment ring 330 may be installed before shroud 200.

Notably, the diameter D2 of the compressed ring after step 440 is less than the diameter D1 of the original continuous ring manufactured in step 410. It should be understood that the difference between diameters D1 and D2 will depend on the amount of overlap between shiplap portions 252 and 254 of shiplap feature 250, which may itself depend on the length X of shiplap portions 252 and 254, as well as the amount of material removed during cutting in step 420. Meanwhile, the space into which shroud 200 is to be installed will dictate the diameter D2. Thus, the length X and amount of overlap of shiplap portions 252 and 254, as well as the diameter D1, may be chosen to achieve the required diameter D2 from the original ring. In general:

$$D2 = D1 - \frac{\text{circumferential length of overlap}}{\pi}$$

wherein the circumferential length of overlap represents the amount by which shiplap portions 252 and 254 overlap. If shiplap portions 252 and 254 overlap for the entire length X, the circumferential length of overlap will simply be equal to X. In general, the circumferential length of overlap will be some value greater than zero and less than or equal to X. However, in an embodiment, shiplap portions 252 and 254 are designed to only partially overlap at installation. For example, the amount of overlap may be between 20% and 40% of the length X. This allows for thermal expansion of shroud 200, which results from very high temperatures through the flow path during operation of gas turbine engine 100. In particular, shroud 200 will generally expand at a higher rate and to a larger extent than turbine housing 310. Since shroud 200 is constrained in other directions, shroud 200 will expand tangentially, such that the amount of overlap between shiplap portions 252 and 254 will increase during operation. Thus, it should be understood that the initial amount of overlap at installation should be chosen such that the thinned portion of each shiplap portion 252 and 254 will never expand beyond length X (i.e., beyond the corresponding recess) during operation, since this will cause clashing between the two ends of the split ring. As further non-limiting examples, the ratio of diameter D2 to diameter D1 may be between 0.995 and 0.999 (e.g., 0.998), the ratio of X to D2 may be between 0.015 and 0.030 (e.g., 0.018, 0.024, 0.025, etc.), and the ratio of the circumferential length of overlap to D2 may be 0.005 and 0.008 (e.g., 0.006, 0.007, etc.).

Figure 6:
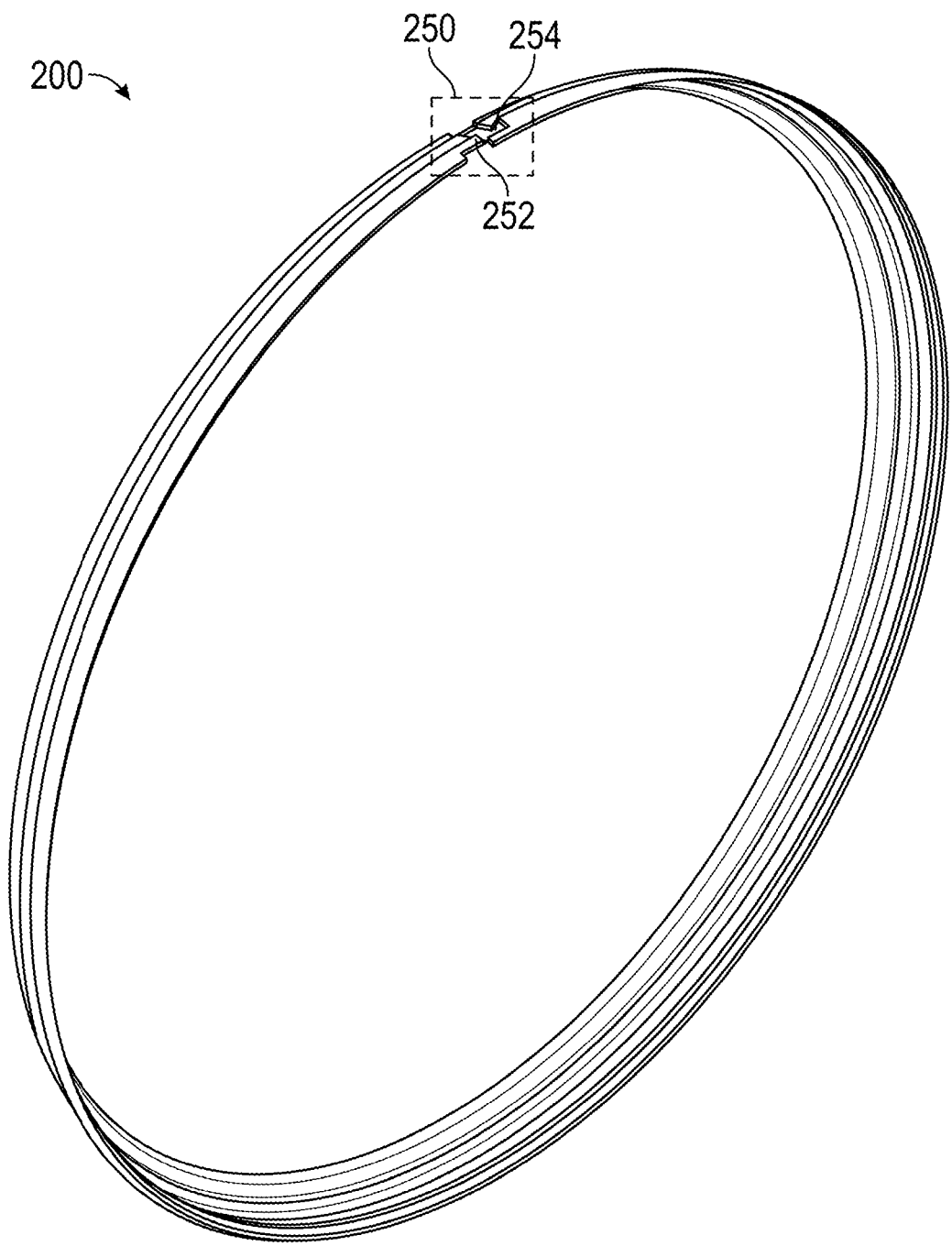
FIG. 6 illustrates a perspective view of an example shroud comprising a split ring with a shiplap feature, according to an embodiment.

FIG. 6 illustrates a perspective view of an example shroud 200 comprising a split ring with a shiplap feature 250 in a multi-slope geometry, according to an embodiment. As illustrated, shroud 200 is concentric with longitudinal axis L. Shroud 200 is generally continuous, but has a single split that is closed by an overlap region in which shiplap portions 252 and 254 overlap each other. This overlap region may form a seal between the radial interior of the split ring and the radial exterior of the split ring to prevent or reduce the leakage of gas from the radial interior of the split ring to the radial exterior of the split ring through the split.

Figure 7:
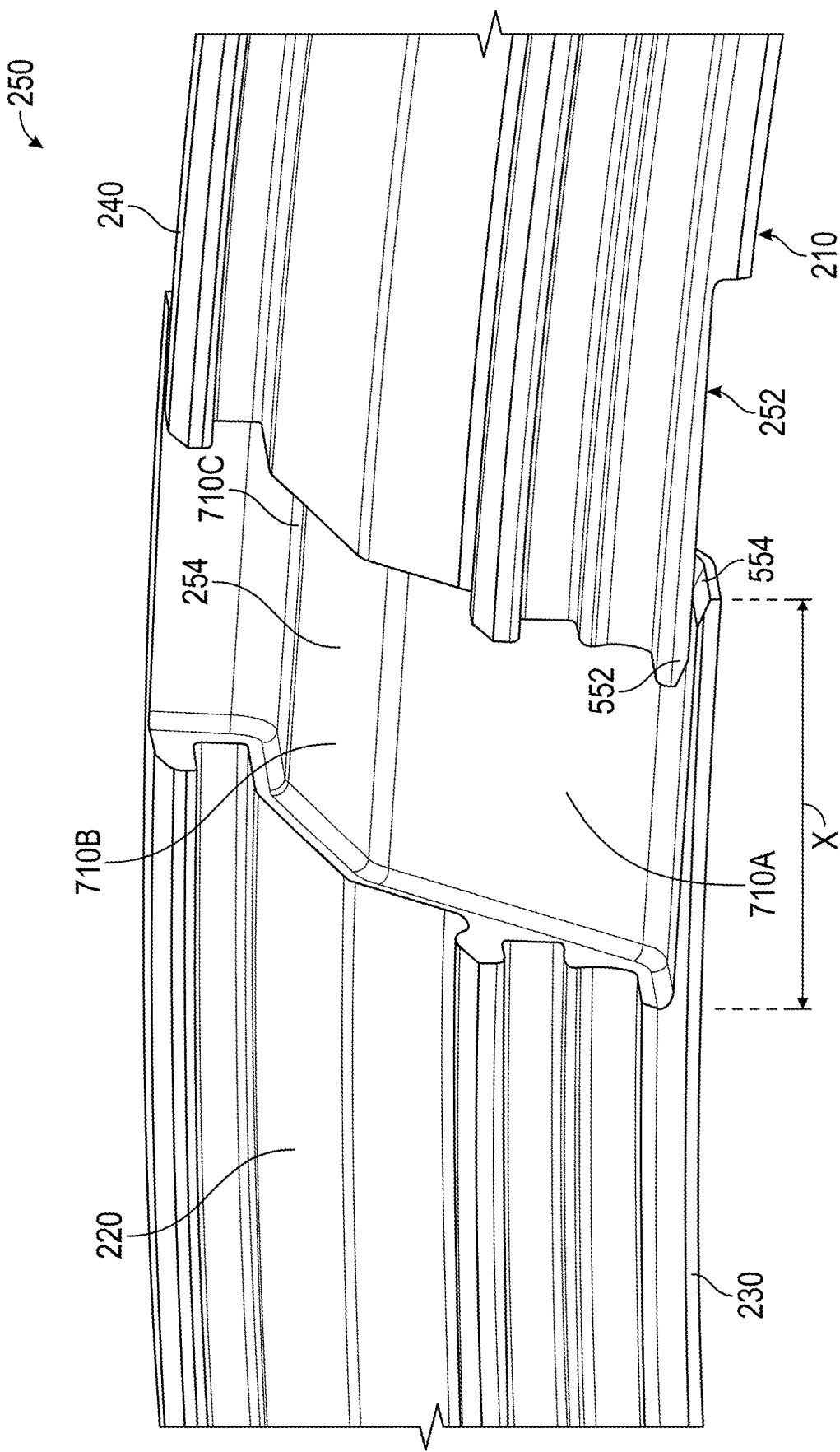
FIG. 7 illustrates a perspective view of a shiplap feature of an example shroud, according to an embodiment.

FIG. 7 illustrates a perspective view of a shiplap feature 250 of an example shroud 200, according to an embodiment. As illustrated, shiplap feature 250 comprises shiplap portions 252 and 254 on opposing ends of the split ring. Shiplap portion 252 comprises a recess in radially inward facing surface 210 that extends circumferentially from an axial edge 552 along radially inward facing surface 210 for a length X. Similarly, shiplap portion 254 comprises a recess in radially outward facing surface 220 that extends circumferentially from an axial edge 554 along radially outward facing surface 220 for a length X. Each recess of shiplap portions 252 and 254 may be formed by milling. Each recess may extend substantially the entire width of shroud 200 between leading edge 230 and trailing edge 240.

The recesses of each shiplap portion 252 and 254 may have the same multi-slope geometry as radially inward facing surface 210. For example, as illustrated, the recess of shiplap portion 254 has a first sloped portion 710A with a slope that matches first sloped portion 210A, a second sloped portion 710B with a slope that matches second sloped portion 210B, and a third sloped portion 710C with a slope that matches third sloped portion 210C. The recess of shiplap portion 252 may have the same sloped portions, but facing radially inward instead of radially outward. Thus, when shiplap portions 252 and 254 are overlapped, the sloped portions of one sits flush against the corresponding sloped portions of the other. This forms a tight seal to prevent or reduce leakage through the split ring.

Notably, when shiplap portions 252 and 254 are overlapped, the radially outward facing surface 220 on each end are aligned, such that engagement features (e.g., grooves or protrusions) in one end are aligned with engagement features in the other end around the circumference of the split ring. It should be understood that, when shiplap portions 252 and 254 are only partially overlapped, there will be a gap between the two ends of radially outward facing surface 220. However, because the engagement features are aligned, they will still be capable of engaging with corresponding engagement features in turbine housing 310.

As illustrated, axial edges 552 and 554 may be beveled. This can prevent or reduce clashing between axial edges 552 and 554. In particular, the beveling may serve to guide or ease shiplap portions 252 and 254 into the overlapped state after step 430 of process 400 and/or at any other time when shiplap portions 252 and 254 are separate.

INDUSTRIAL APPLICABILITY

In disclosed embodiments, a multi-slope shroud 200 is manufactured as a single continuous ring that is then split along a single linear (e.g., radial) path 510. The splitting of the ring reduces hoop stress within shroud 200 by allowing the material of the ring room to expand differentially, relative to turbine housing 310, under high temperatures.

The two ends of the split ring of shroud 200 are then machined to produce complementary shiplap portions 252 and 254. During installation of shroud 200 (e.g., within a stage of turbine 140), the split ring is compressed, such that shiplap portions 252 and 254 overlap and thereby seal the split in the ring. Shiplap portions 252 and 254 may be only partially overlapped during installation to allow for thermal expansion of the material of shroud 200 during operation of gas turbine engine 100. It should be understood that shroud 200 may be installed as an original part in a gas turbine engine 100 or as a retrofit to replace a prior shroud (of same or different design) in gas turbine engine 100.

The disclosed embodiments enable a shroud 200, such as a tip shroud, to have a multi-slope geometry in a machined, split-ring design. The multi-slope geometry enables radially inward facing surface 210 of shroud 200 to tightly follow the flow path through gas turbine engine, while minimizing space and weight. In addition, the split-ring design reduces leakage (e.g., by reducing potential points of leakage) and reduces parts cost and installation time (e.g., by reducing the number of components that must be installed), as compared to a shroud formed from a plurality of segments.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a gas turbine engine, it will be appreciated that it can be implemented in various other types of turbomachines and machines with shrouds, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:
1. An annular shroud comprising:
a split ring having a single split with a first axial edge and a second axial edge on opposing sides of the split, the split ring being formed from a stainless steel or a superalloy,
wherein a radially inward facing surface of the split ring comprises a multi-slope geometry from a leading edge of the split ring to a trailing edge of the split ring,
wherein the split ring includes a first shiplap portion comprising a recess extending from the first axial edge into the radially inward facing surface of the split ring, wherein the split ring includes a second shiplap portion comprising a recess extending from the second axial edge into a radially outward facing surface of the split ring, and wherein the first shiplap portion and the second shiplap portion are configured to at least partially overlap each other.

2. The annular shroud of claim 1, wherein the multi-slope geometry comprises at least three portions having different slopes from each other.

3. The annular shroud of claim 1, wherein an overlap region, in which the first shiplap portion and the second shiplap portion at least partially overlap each other, forms a seal between a radial interior of the split ring and a radial exterior of the split ring.

4. The annular shroud of claim 1, wherein both the first axial edge and the second axial edge are beveled.

5. The annular shroud of claim 1, further comprising an aperture into the split ring, wherein the aperture is configured to receive an anti-rotation pin.

6. The annular shroud of claim 5, wherein the aperture is positioned 180 degrees around a circumference of the split ring from a point in an overlap region, in which the first shiplap portion and the second shiplap portion at least partially overlap each other.

7. A turbine comprising:
at least one stage, wherein the at least one stage comprises:
a turbine rotor assembly; and
an annular shroud, comprising:
a split ring having a single split with a first axial edge and a second axial edge on opposing sides of the split, the split ring being formed from a stainless steel or a superalloy,
wherein a radially inward facing surface of the split ring comprises a multi-slope geometry from a leading edge of the split ring to a trailing edge of the split ring,
wherein the split ring includes a first shiplap portion comprising a recess extending from the first axial edge into the radially inward facing surface of the split ring,
wherein the split ring includes a second shiplap portion comprising a recess extending from the second axial edge into a radially outward facing surface of the split ring, and
wherein the first shiplap portion and the second shiplap portion are configured to at least partially overlap each other.

8. The turbine of claim 7, further comprising an abradable material affixed to the radially facing inward surface.

9. The turbine claim 7, wherein the annular shroud is positioned encircling the turbine rotor assembly and concentric with the turbine rotor assembly and a longitudinal axis of the turbine.

10. A gas turbine engine comprising:
a compressor;
a combustor downstream from the compressor; and
a turbine downstream from the combustor, wherein the turbine comprises a plurality of stages, and wherein at least one of the plurality of stages comprises:
a turbine rotor assembly, and
an annular shroud encircling the turbine rotor assembly and concentric with the turbine rotor assembly and a longitudinal axis of the turbine,
wherein the annular shroud comprises a split ring having a single split with a first axial edge and a second axial edge on opposing sides of the split, the split ring being formed from a stainless steel or a superalloy,
wherein a radially inward facing surface of the split ring comprises a multi-slope geometry from a leading edge of the split ring to a trailing edge of the split ring,
wherein the split ring includes a first shiplap portion comprising a recess extending from the first axial edge into the radially inward facing surface of the split ring,
wherein the split ring includes a second shiplap portion comprising a recess extending from the second axial edge into a radially outward facing surface of the split ring, and
wherein the first shiplap portion and the second shiplap portion at least partially overlap each other.

11. The gas turbine engine of claim 10, wherein the multi-slope geometry of each annular shroud comprises at least three portions having different slopes from each other.

12. The gas turbine engine of claim 10, wherein both the first axial edge and the second axial edge of each annular shroud are beveled.

13. The gas turbine engine of claim 10, wherein the annular shroud engages with a turbine housing of the turbine, and wherein the gas turbine engine further comprises, for the annular shroud, an anti-rotation pin inserted into a pin hole formed by an aperture through the turbine housing and an aligned aperture into the split ring of the annular shroud.

14. The gas turbine engine of claim 13, wherein, in the annular shroud, the aligned aperture is positioned 180 degrees around a circumference of the split ring from a point in an overlap region, in which the first shiplap portion and the second shiplap portion at least partially overlap each other.

* * * * *